United States Patent
Seki

[11] Patent Number: 5,778,265
[45] Date of Patent: Jul. 7, 1998

[54] CAMERA ALLOWING SETTING OF PRINT NUMBER

[75] Inventor: Reiji Seki, Tondabayashi, Japan

[73] Assignee: Minolta Co., Ltd., Osaka, Japan

[21] Appl. No.: 777,039

[22] Filed: Dec. 30, 1996

[30] Foreign Application Priority Data

Jan. 31, 1996 [JP] Japan .................. 8-014981

[51] Int. Cl.$^6$ .............. G03B 17/24; G03B 17/00
[52] U.S. Cl. .............. 396/311; 396/297; 396/299; 396/319
[58] Field of Search .............. 396/310, 311, 396/312, 313, 314, 315, 316, 317, 318, 319, 320, 321, 207, 208, 389, 390, 297, 299

[56] References Cited

U.S. PATENT DOCUMENTS

| | | |
|---|---|---|
| 4,488,796 | 12/1984 | Edwards .................. 396/511 |
| 4,760,413 | 7/1988 | Taniguchi et al. .................. 396/319 |
| 4,843,418 | 6/1989 | Taniguchi et al. .................. 396/319 |
| 5,057,857 | 10/1991 | Hata et al. .................. 396/319 |
| 5,160,952 | 11/1992 | Iwashita et al. .................. 396/310 |
| 5,293,189 | 3/1994 | Taniguchi et al. .................. 396/319 |
| 5,467,155 | 11/1995 | Miyazaki et al. .................. 396/207 |
| 5,483,320 | 1/1996 | Aoki et al. .................. 396/310 |

*Primary Examiner*—Safet Metjahic
*Assistant Examiner*—Nicholas J. Tuccillo
*Attorney, Agent, or Firm*—Burns, Doane, Swecker & Mathis, LLP

[57] ABSTRACT

Malfunction is prevented in a camera which allows setting of print number at the time of photographing. In the camera, whether the film is a reversal film or not is determined. When the loaded film is a negative film, a print number is initially set to 1. If the loaded film is a reversal film, the print number is initially set to 0. However, when a select switch is ON, the set number is 1, similar to the case of a negative film. The setting is for a counter CPRT storing the print number data.

24 Claims, 8 Drawing Sheets

28 BLACK ZONE

CODE AREA

CAMERA ALLOWING SETTING OF PRINT NUMBER

BACKGROUND OF THE INVENTION

1. Field of the Invention

The present invention relates to a camera, and more specifically to a camera which uses a film allowing the setting of a print number on a magnetic layer provided on a rear surface of the film.

2. Description of the Related Art

A camera system which allows the setting of a print number at the time of a photographing operation has been proposed. In such a camera system, the number of prints is recorded on a magnetic layer provided on the film.

If a reversal film (positive film) is used in such a camera as described above and the user forgets or is not aware of the fact that a reversal film is loaded, the number of prints may possibly be set erroneously, under the assumption that a negative film is used.

A reversal film is for preparing slides and at the time of printing, generally, the film is once developed and ones which deserve printing are selected. Therefore, it is not likely that the number of prints is set at the time of photographing for the reversal film. Further, the cost of printing for the reversal film is high. Therefore, such an error may result in an unexpected high cost of printing.

SUMMARY OF THE INVENTION

Therefore, an object of the present invention is to prevent erroneous operation in a camera which allows setting of a print number at the time of a photographing operation.

Another object of the present invention is to provide a camera which surely prevents the user from paying unnecessary and unexpected cost of printing.

The camera in accordance with the present invention includes a setter for setting a print condition, a detector for detecting a film, and a unit for performing a prescribed operation before allowing setting of the print condition, when the film is detected to be a reversal film.

When the camera is loaded with a reversal film, a prescribed operation is performed before the setting of the print number. Therefore, unconditional setting of the print condition for the reversal film can be prevented.

Accordingly, erroneous operation can be prevented in a camera which allows setting of the print number at the time of photographing.

The camera in accordance with another aspect of the present invention includes a setter for setting the number of prints, a detector for detecting film type, and a unit for performing a prescribed operation before allowing setting of the print number, when the film is detected to be a reversal film.

When the camera is loaded with a reversal film, a prescribed operation is performed before setting the print number. Therefore, unconditional setting of the print number for the reversal film can be prevented.

As a result, unnecessary cost is never imposed on the user when he or she uses the camera which allows setting of the print number at the time of photographing.

Preferably, the prescribed operation is inhibition of the setting of print number, a warning not to set the number of prints, or a display of the detected film type.

When the camera is loaded with a reversal film, setting of the print number is inhibited, a warning is given or the detected film type is displayed. Therefore, the user is surely informed of the type of the film loaded, and hence the number of prints can be set only when it is necessary.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
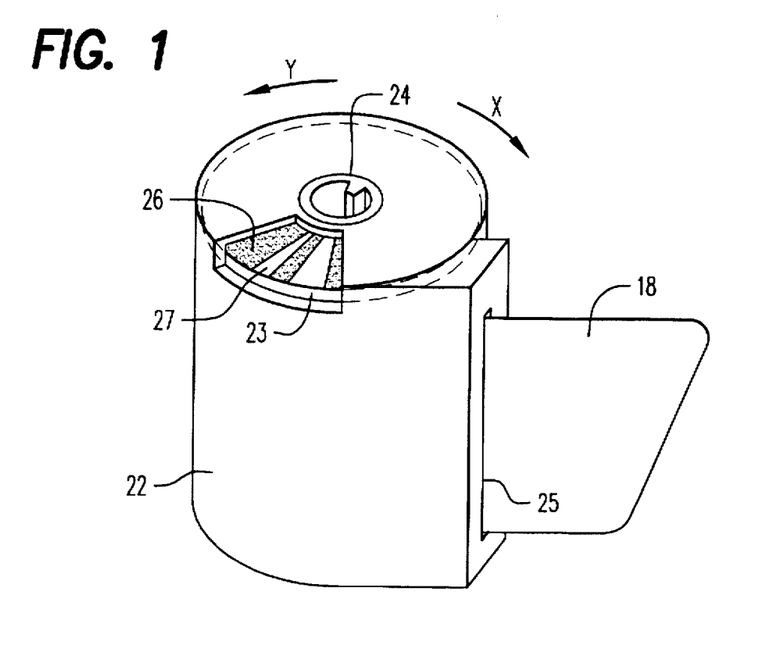
FIG. 1 is a perceptive view of a film cartridge.

An embodiment of the present invention will be described with reference to the figures. FIG. 1 is a perspective view of a film cartridge 22 used for a pre-wind camera to which the present invention is applied. Referring to FIG. 1, a film 18 is completely wound within film cartridge 22 when not loaded in a camera. When a spool 24 is rotated in the direction Y, film 18 is fed out from a film outer/inlet 25 of film cartridge 22. When spool 24 is rotated in the direction X, film 18 wound and refracted in film cartridge 22. A data disk 23 is formed integrally with spool 24, so that when spool 24 is rotated, data disk 23 rotates together. A portion of data disk 23 is exposed at an opening 26. Data disk 23 bears a bar code 27 printed thereon.

By providing a photoreflector, not shown, opposed to opening 26 and by rotating spool 24, the bar code 27 on data disk 23 can be read by the camera. Bar code 27 stores, in the form of codes, film type (color/monochrome, negative/positive and so on), film sensibility, film number information and so on.

Figure 2:
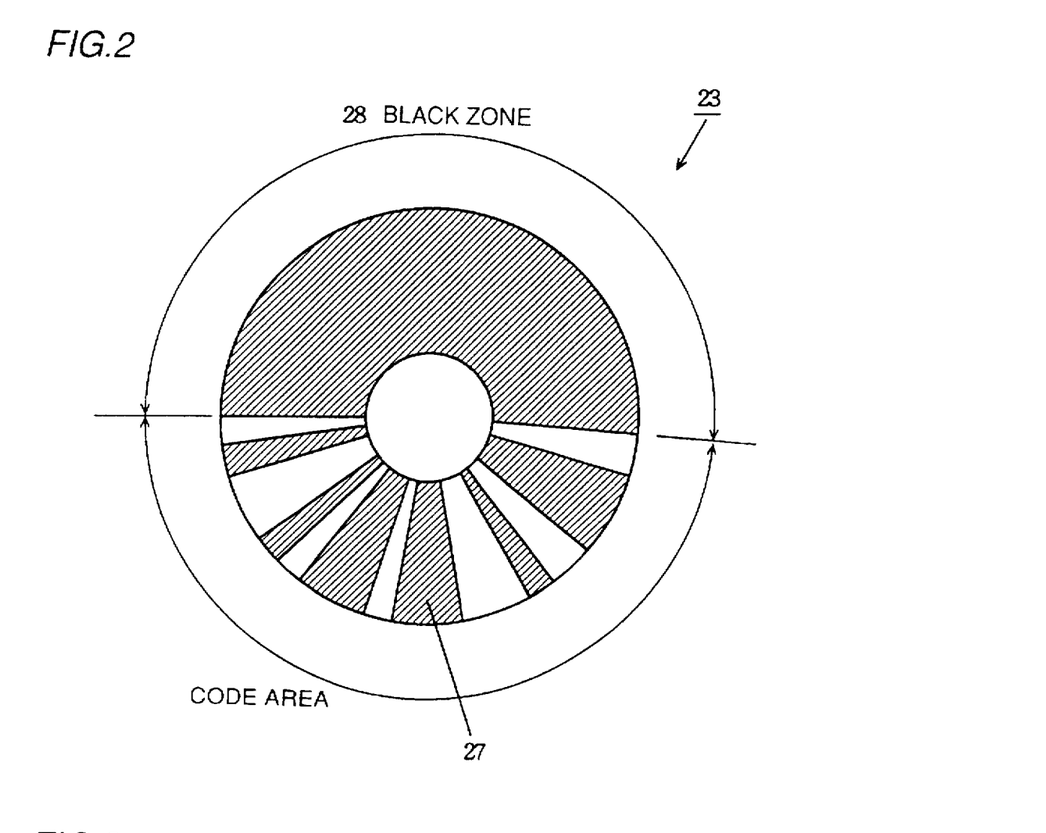
FIG. 2 is a plan view of a data disk.

FIG. 2 is a plan view of data disk 23 shown in FIG. 1. Referring to FIG. 2, bar code 27 on data disk 23 includes a black zone 28 and a code area. Block zone 28 is used for detecting a start position of data on bar code 27. In the code area, film sensibility, color/monochrome, negative/reversal (positive) information, and film number information are recorded.

Figure 3:
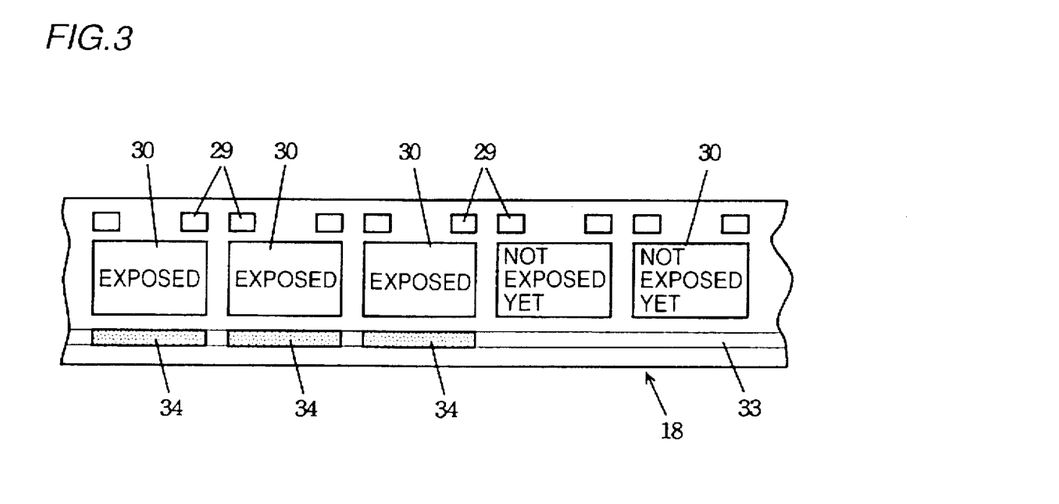
FIG. 3 is a plan view of a film.

FIG. 3 shows a configuration of film 18. Referring to FIG. 3, a pair of perforations 29 are provided for one exposure frame 30. At a lower portion of exposure frame 30, a magnetic layer 33 is provided continuously, and at a position corresponding to exposure frame 30 of magnetic layer 33, print number information, which will be described later, is written as magnetic information 34.

Figure 4:
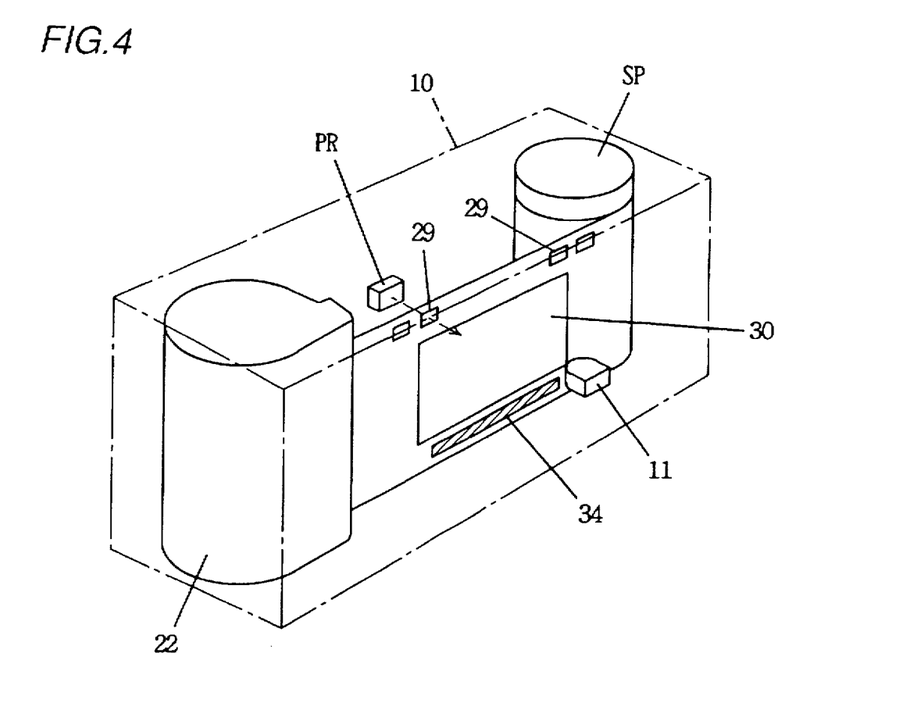
FIG. 4 is an illustration showing how an exposed surface of the film is detected in the camera.

FIG. 4 shows how a pre-wind camera 10 is loaded with film 18. Referring to FIG. 4, film 18 fed out from film cartridge 22 is taken up by spool SP. perforations 29 are detected by a photoreflector PR provided in camera 10, so that feeding of film 18 is controlled. An exposure frame 30 is defined by perforations 29, a magnetic information recording portion is provided therebelow, and magnetic information 34 is recorded by magnetic head 11 at magnetic information recording portion. The magnetic information 34 recorded on magnetic information recording portion includes not only the print number mentioned above but also information of each frame such as photographing format, time of photographing, shutter speed, aperture value and so on, or it may be a phrase or a sentence input by the user.

Figure 5:
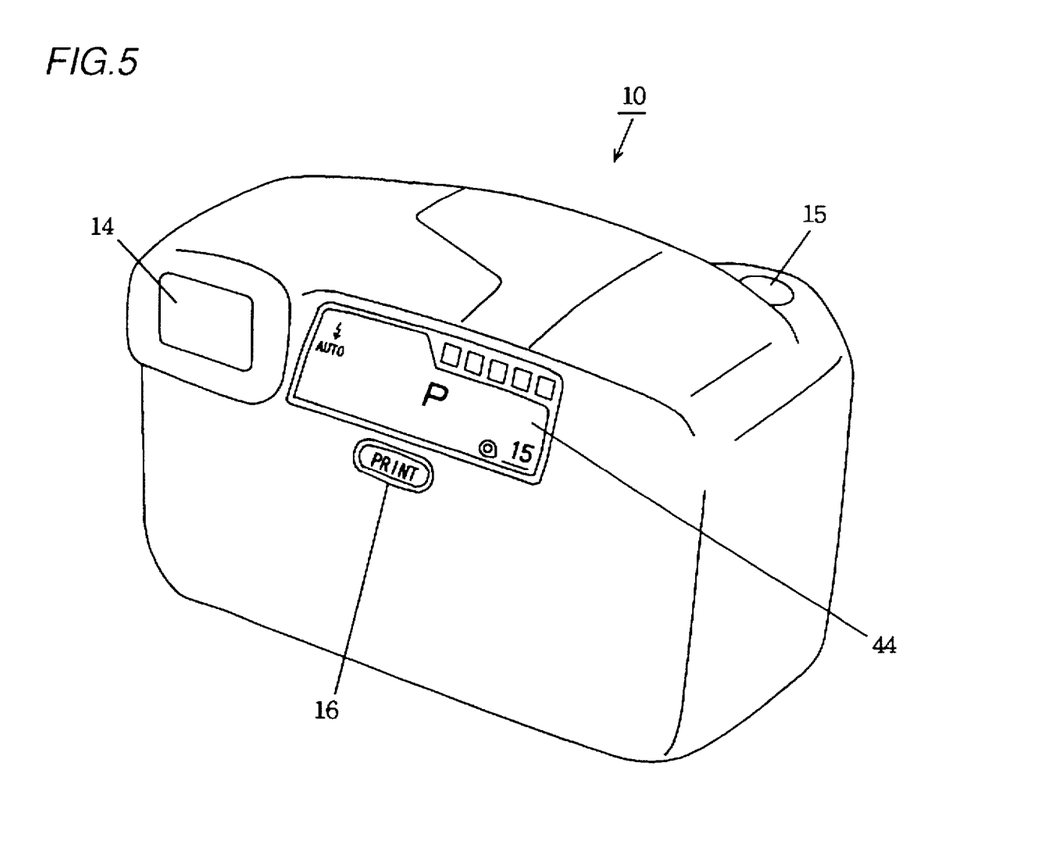
FIG. 5 is a perspective view showing appearance of the camera to which the present invention is applied.

FIG. 5 is a perspective view showing appearance of a camera to which the present invention is applied. Referring to FIG. 5, camera 10 has a finder 14 for finding an object, a release button 15 for measuring brightness and distance and for exposure, a print number setting switch for setting number of printing at the magnetic information recording portion corresponding to the exposure plane of the loaded film 18, and an LCD 44 displaying information necessary for photographing operation.

Figure 6:
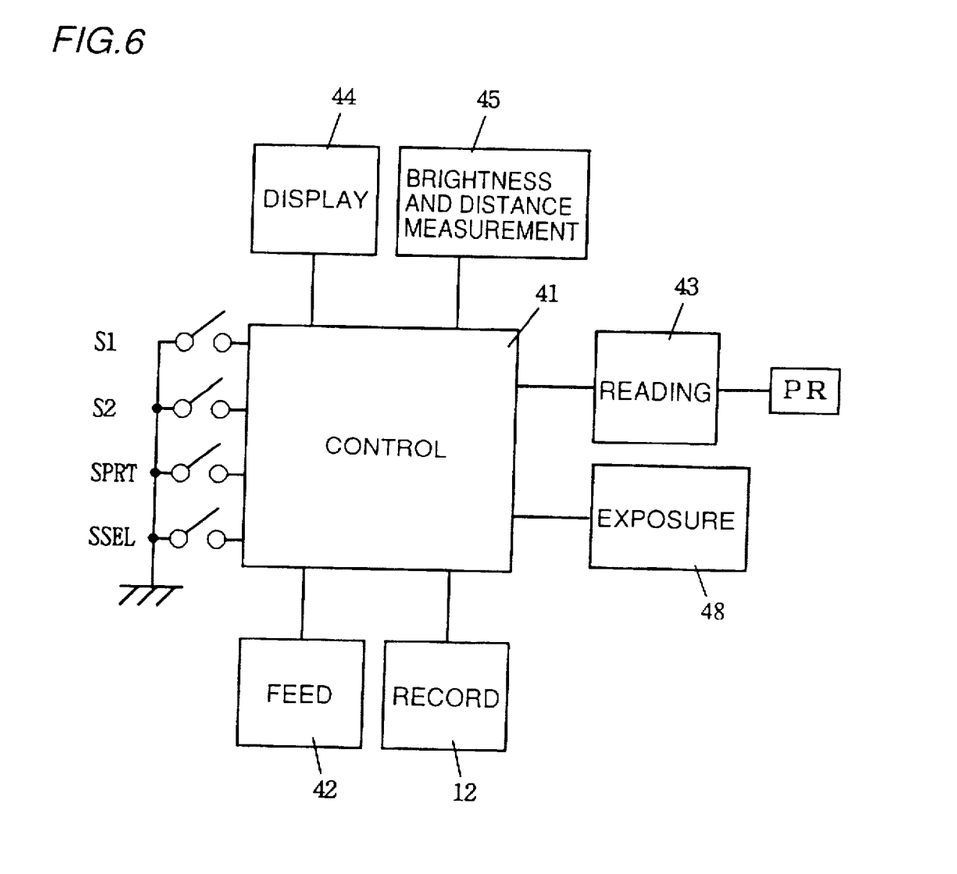
FIG. 6 is a block diagram showing a main portion of the camera to which the present invention is applied.

FIG. 6 is a block diagram showing a main portion of a camera 10 shown in FIG. 5. Referring to FIG. 6, camera 10 includes LCD 44 for displaying the number of printing, count of film and so on; a brightness and distance measuring portion 45 for measuring brightness and distance with respect to the object; a reading portion 43 for reading information (negative/reversal (positive), film number information and so on) related to film 18 from film cartridge 22; an exposure portion 48 for exposing film 18; a recording portion 12 for magnetically recording information of print number at a lower portion of the photographed plane while the film is wound after photographing operation; a film feed portion 42 for feeding and taking up the film; and a control portion 41 controlling various portions mentioned above.

To control portion 41, connected are switch S1 which is turned ON by the first stroke of release button 15 and drives brightness and distance measuring portion 45 to measure brightness and distance, and to exit from print number setting mode; a step S2 which is turned ON by a second stroke of release button 15 for performing exposure; a switch SPRT for setting the number of printing by using recording portion 12; and a switch SSEL for allowing, when a reversal film is loaded, control of print number similar to the control for the negative film. Control portion 41 controls various portions mentioned above in accordance with the state of these switches.

Figure 7:
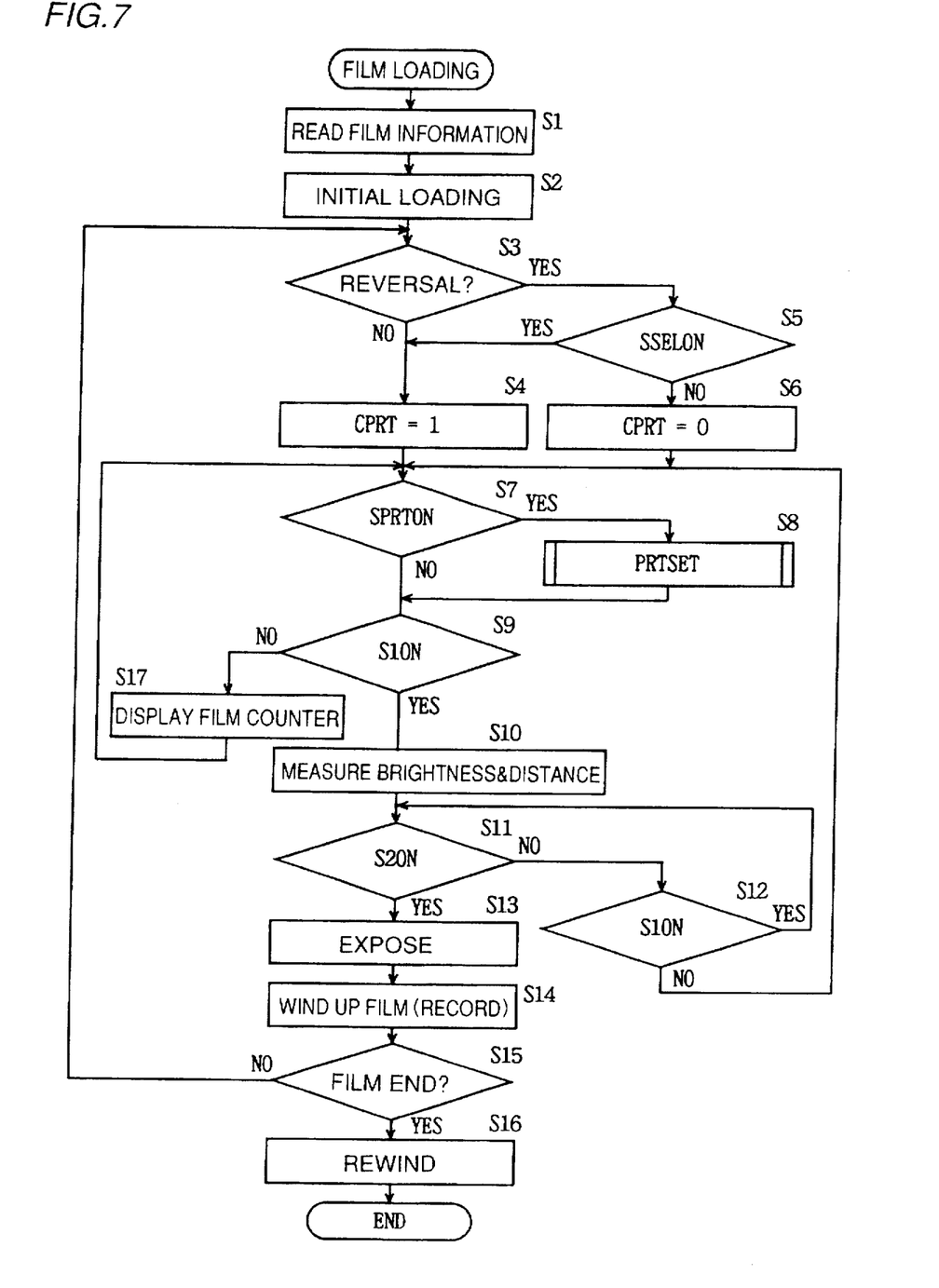
FIG. 7 is a flow chart showing a process after loading of the film.

FIG. 7 is a flow chart showing an operation performed when camera 10 is loaded with film 18. Referring to FIG. 7, when the camera is loaded with film 18, information related to the film (reversal/negative, film number information) is read from data disk 23 of film cartridge 22 (step S1, hereinafter "step" will be omitted). Thereafter, initial loading is performed (S2).

When the loaded film 18 is a negative film, initial setting of print number CPRT is set to 1. When the loaded film is a reversal film, the number is initially set to 0. However, when select switch SSEL is ON, the initial setting is to 1, which is the same as for the negative film. Here, CPRT refers to a count storing data of print number (S3—S6).

Whether print number setting switch SPRT and switch S1 are ON/OFF are determined (S7, S9). At this time, film counter display appears on LCD 44 (S17). When print number setting switch SPRT is ON (YES in S7), the flow proceeds to a print number setting subroutine "PRTSET" (S8). When switch S1 is ON (YES in S9), brightness and distance are measured (S10). Whether switches S2 and S1 are ON/OFF is determined (S11, S12). When switch S2 is turned ON, exposure is performed (S13). After exposure, film is wound up, and the set print number information is recorded on the film while winding up (S13, S14). Whether the film is used up or not is determined (S15), and if the film is used up, the film is re-wound (S16).

Figure 8:
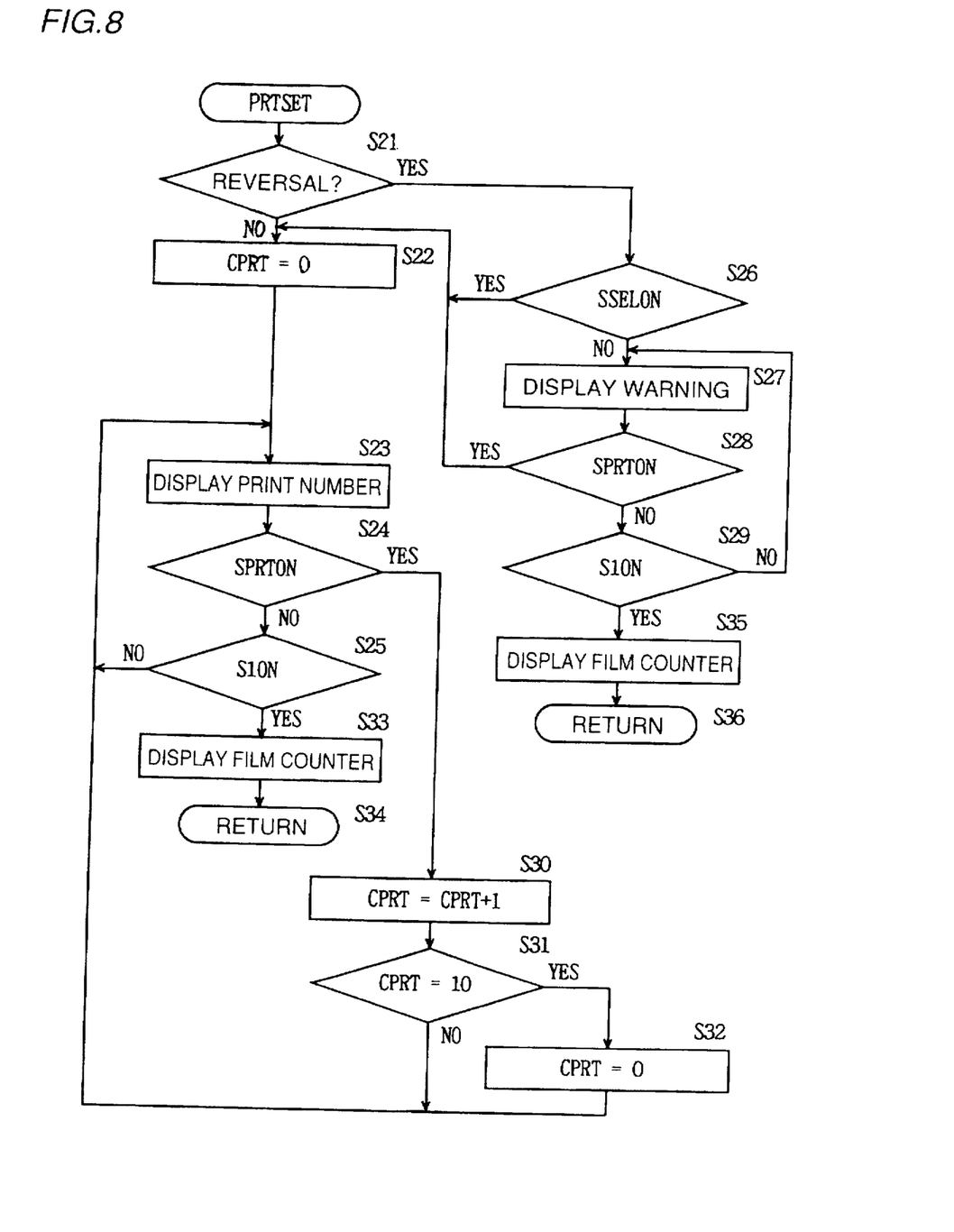
FIG. 8 is a flow chart showing contents of a PRTSET subroutine.

FIG. 8 is a flow chart showing a print number setting subroutine. Referring to FIG. 8, when the film is a negative film, the setting of number is set to 0 (NO in S21, S22). Even when the film is a reversal film, the setting of the number is set to 0 if switch SSEL is ON (YES in S21, S26, S22). Print number is displayed instead of film counter on LCD 44 (S23). It is preferable to flicker the number information and a "PRINT" mark, so that it is easily noticed that the print number is being set.

When the switch SPRT is turned ON, the set number is increased by one (YES S24, S30). The number 9 is followed by 0 (YES in S31, S32).

When switch S1 is turned ON (YES in S25), the display on LCD 44 is switched to the film count, and the flow returns (S33, S34). At this time, if the set film number is other than 1, the indication "PRINT" is flickered.

When the film is a reversal film and the switch SSEL is not ON, there is given a warning against a reversal film (NO in S26, S27). Characters "FILM CS" are flickered. When switch SPRT is turned on regardless of the warning, setting of the print number similar to the negative film is allowed (YES in S28, S22). When switch S1 is turned ON, the display is switched to the film counter display, and a flow returns (YES in S29, S35, S36).

Figure 9:
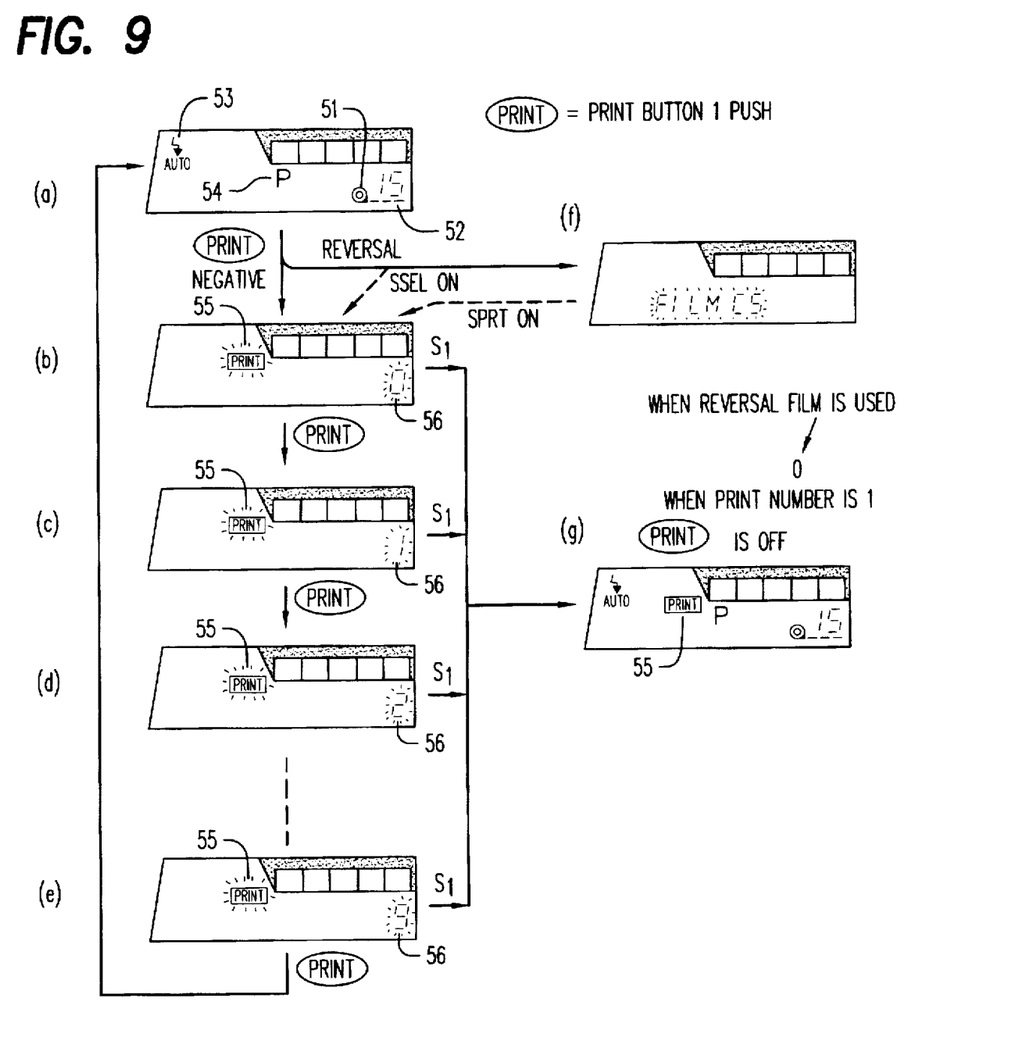
FIG. 9 shows contents displayed on an LCD.

FIG. 9 shows the display on LCD 44. Here, (a) corresponds to the normal state. Here, film counter is displayed. Near the number information, patterns 51 and 52 representing film cartridge 22 and film 18 are displayed so that it can be easily understood as film counter display. Information related to photographing operation such as flash mode 53 and exposure mode 54 is also displayed.

Now, displays (b), (c), (d) and (e) represent print number setting mode. In order to indicate the print number setting mode, "PRINT" mark 55 and set number 56 are flickered. Display not related to the setting of print number, such as exposure mode, is turned off.

The display (f) appears when the film is a reversal film and switch SPRT is turned ON. Indication "FILM CS" flickers.

The display (g) is a normal display which appears after the setting of the print number. In order to indicate that the pint number has been set, "PRINT" mark 55 is flickered. However, when the set number is 1 (in case of reversal film 0), "PRINT" mark 55 is not turned on.

In the flow chart of FIG. 7, every time a photographing operation is completed, the flow returns to the step S3, and print number is set to the initial value in step S4 or S6. However, reset may not be performed. In other words, after the completion of the photographing operation, the flow may proceed not to S3 but to S7.

Further, the number may be set not by the switch SSEL but by an EEPROM or the like.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera, comprising:

means for setting a print number;

means for detecting a film; and means for performing a prescribed operation relating to the print number before allowing setting of the print number when said film detecting means detects said film to be a reversal film.

2. The camera according to claim 1, wherein said film is loaded in a cartridge, said cartridge has information corresponding to a film type recorded optically thereon, and said detecting means detects the information optically.

3. The camera according to claim 1, wherein said film has a recording portion at a position corresponding to a photographing frame, and said setting means records the print condition at said recording portion.

4. The camera according to claim 3, wherein said recording portion is a magnetic layer provided on a rear surface of said film.

5. A camera, comprising:

means for setting a print number;

means for detecting a film type; and means for performing a prescribed operation before allowing setting of the print number when said film detecting means detects said film to be a reversal film.

6. The camera according to claim 5, wherein said film is loaded in a cartridge, said cartridge has information corresponding to the film type recorded optically thereon, and said detecting means detects the information optically.

7. The camera according to claim 5, wherein said prescribed operation is inhibition of setting of the print number.

8. The camera according to claim 5, wherein said prescribed operation is a warning display.

9. The camera according to claim 5, wherein said prescribed operation is display of a film type.

10. The camera according to claim 5, wherein said prescribed operation is setting the print number to zero.

11. The camera according to claim 5, wherein said film has a recording portion at a position corresponding to a photographing frame, and setting means records the print number at said recording portion.

12. The camera according to clam 11, wherein said recording portion is a magnetic layer provided on a rear surface of said film.

13. A camera, comprising:

means for setting a print number at a recording portion corresponding to a photographing frame on a film when photographing;

means for detecting the type of film loaded in the camera; and means for performing a prescribed operation before allowing setting of the print number when said detecting means detects said film to be a reversal film.

14. The camera according to claim 13, wherein said recording portion is a magnetic layer provided at a rear surface of said film.

15. The camera according to claim 13, wherein said film is loaded in a cartridge, said cartridge has information corresponding to film type recorded optically thereon, and said detecting means detects the information optically.

16. The camera according to claim 12, wherein said prescribed operation is inhibition of setting of the print number.

17. The camera according to claim 13, wherein said prescribed operation is display of a warning.

18. The camera according to claim 13, wherein said prescribed operation is a display of film type.

19. The camera according to claim 13, wherein said prescribed operation is setting the print number to zero.

20. A camera, comprising:

setting means for setting a print number;

recording means for recording said set print number on a film;

reading means for reading information related to the film from a loaded film cartridge;

determining means for determining whether said loaded film is a positive film based on said read information; and inhibiting means for inhibiting setting by said setting means when said loaded film is determined to be a positive film.

21. A camera, comprising:

setting means for setting a print number;

an operating member operated for setting said print number;

recording means for recording said set print number on a film;

reading means for reading information related to the film from a loaded film cartridge;

determining means for determining whether the loaded film is a positive film based on the read information; and warning means for giving a warning when said loaded film is a positive film and said operating member is operated.

22. A camera, comprising:

recording means for recording a set print number on a film;

reading means for reading information related to the film from a loaded film cartridge;

determining means for determining whether said loaded film is a positive film based on said the information read by said reading means; and recording control means for controlling said recording means such that data representing no printing is recorded when said loaded film is determined to be a positive film.

23. A camera, comprising:

setting means for setting a print number;

operating means for setting said print number;

recording means for recording said set print number on a film;

display means for producing a display related to a number of photographs; and display switching means for switching said display, when the print number is set by said setting means, from a display related to the number of photographs to the print number which has been set by said setting means.

24. A camera, comprising:

means for setting a print condition at a recording portion corresponding to a photographing frame on a film when photographing;

means for detecting the type of film loaded in the camera; and means for performing a prescribed operation related to the print condition before allowing setting of the print condition when said detecting means detects said film to be a reversal film.

* * * * *